United States Patent
Tsai

(10) Patent No.: US 11,971,493 B2
(45) Date of Patent: *Apr. 30, 2024

(54) INDOOR POSITIONING METHOD BASED ON IMAGE VISUAL FEATURES AND ELECTRONIC DEVICE

(71) Applicant: Nanning FuLian FuGui Precision Industrial Co., Ltd., Nanning (CN)

(72) Inventor: Cheng-Yen Tsai, New Taipei (TW)

(73) Assignee: Nanning FuLian FuGui Precision Industrial Co., Ltd., Nanning (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/195,342

(22) Filed: May 9, 2023

(65) Prior Publication Data
US 2023/0280478 A1   Sep. 7, 2023

Related U.S. Application Data

(63) Continuation of application No. 17/460,570, filed on Aug. 30, 2021, now Pat. No. 11,698,467.

(51) Int. Cl.
*G01S 19/48* (2010.01)
*G01S 19/51* (2010.01)
*H04W 64/00* (2009.01)

(52) U.S. Cl.
CPC .......... *G01S 19/485* (2020.05); *G01S 19/51* (2013.01); *H04W 64/006* (2013.01)

(58) Field of Classification Search
CPC ...... G06V 10/462; G06V 20/64; G06V 10/44; G06V 10/46; G06V 10/245; G06V 20/36;
(Continued)

(56) References Cited

U.S. PATENT DOCUMENTS

| 11,698,467 B2* | 7/2023 | Tsai | G01S 5/0264 |
| | | | 455/456.1 |
| 2013/0344892 A1* | 12/2013 | Lymberopoulos | H04W 64/00 |
| | | | 455/456.1 |
| 2018/0316877 A1* | 11/2018 | Gruenke | G06T 7/73 |

FOREIGN PATENT DOCUMENTS

CN    103369466 A  * 10/2013
CN    103369466 A    10/2013
(Continued)

OTHER PUBLICATIONS

Seo et al., "Perspective Projection Algorithm Enabling Mobile Device's Indoor Positioning" (Year: 2018).*
(Continued)

*Primary Examiner* — Dung Hong
(74) *Attorney, Agent, or Firm* — ScienBiziP, P.C.

(57) ABSTRACT

An indoor positioning method based on image visual features is disclosed. A Wi-Fi signal strength value of a Wi-Fi tag is matched with a signal strength list to obtain a first location of a first Wi-Fi tag with the greatest matching degree. A SURF descriptor of an image of the Wi-Fi tag is matched with SURF descriptors recorded in the signal strength list to discover an image of a Wi-Fi tag with the greatest matching degree, thereby obtaining a second location of a second Wi-Fi tag corresponding to the image of the Wi-Fi tag with the greatest matching degree. A three location of a three Wi-Fi tag is obtained according to a homography matrix corresponding to the image of the Wi-Fi tag with the largest matching degree. Positioning information of the mobile device is obtained according to the first location, the second location and the third location.

14 Claims, 5 Drawing Sheets

(58) Field of Classification Search
CPC ........ G01S 17/89; G01S 17/46; G01S 19/485; G01S 19/51; H04W 64/006; H04W 64/00; H04W 4/023; H04W 64/003; H04W 84/12; H04W 4/33
See application file for complete search history.

(56) References Cited

FOREIGN PATENT DOCUMENTS

| | | | | | |
|---|---|---|---|---|---|
| CN | 104866873 | A | | 8/2015 | |
| CN | 104902562 | A | | 9/2015 | |
| CN | 103369466 | B | | 3/2016 | |
| CN | 106767810 | A | * | 5/2017 | ........... G01C 21/206 |
| CN | 106767810 | A | | 5/2017 | |
| CN | 106793086 | A | * | 5/2017 | ........... G01C 21/206 |
| CN | 106793086 | A | | 5/2017 | |
| CN | 104866873 | B | * | 6/2018 | |
| CN | 104866873 | B | | 6/2018 | |
| WO | 2015099738 | A1 | | 7/2015 | |
| WO | WO-2015099738 | A1 | * | 7/2015 | ............. G01S 5/021 |
| WO | 2020171334 | A1 | | 8/2020 | |
| WO | WO-2020171334 | A1 | * | 8/2020 | |

OTHER PUBLICATIONS

Brandon, "Smart Phone-based Indoor Guidance System for the Visually Impaired" (Year: 2012).*

* cited by examiner

INDOOR POSITIONING METHOD BASED ON IMAGE VISUAL FEATURES AND ELECTRONIC DEVICE

BACKGROUND

1. Technical Field

The disclosure relates to network communication methods, and more particularly to an indoor positioning method based on image visual features for an electronic device and a computer program product using the method.

2. Description of Related Art

Many indoor positioning technology solutions comprise infrared technology, radio frequency identification technology, ultra-wideband technology, wireless local area network, optical tracking positioning technology, image analysis, beacon positioning, computer vision positioning technology and so on. However, due to the limitations of positioning time, positioning accuracy, equipment cost, and complex indoor environment, the above-mentioned positioning technology cannot yet completely solve indoor positioning problems.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

Figure 1:
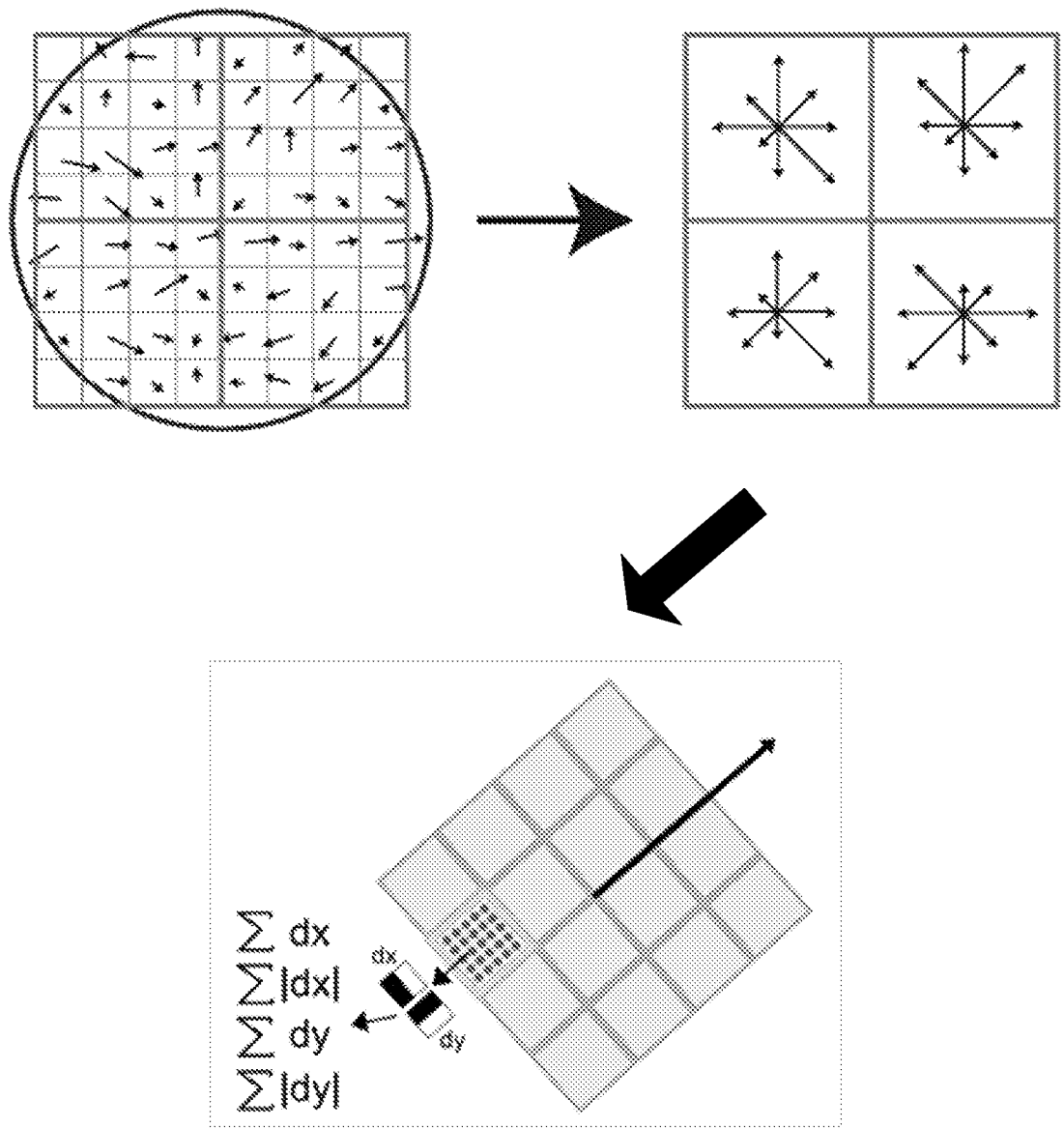
FIG. 1 is a schematic diagram of creation of SURF points according to an embodiment of the preset disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

To implement an indoor positioning method based on image visual features of an embodiment of the present invention, a map database needs to be established in a pre-processing stage. The operation is described as follows.

Wireless fidelity (Wi-Fi) tags (WiFiTag) are evenly and appropriately deployed in an indoor area, and each of the Wi-Fi tags is unique. The Wi-Fi tags can be deployed in any corner of the indoor area, and the number of the Wi-Fi tags deployed determines a positioning accuracy. A terminal device, for example, a mobile phone or a tablet, obtains signal information between each of the Wi-Fi tags and multiple Wi-Fi access points (APs) in the indoor area. The signal information may be, for example, received signal strength indicator (RSSI) values, received packet strength indicator (RPSI) values or any other wireless signals. A signal strength list is generated based on the signal information obtained by each of the Wi-Fi tags and media access control (MAC) addresses of each of the Wi-Fi tags.

The signal strength list also includes the number and signal strength values of Wi-Fi APs within a signal range of each of the Wi-Fi tags. Low-intensity Wi-Fi signals are filtered out. A RSSI value, for example, less than a set value, for example, 90 dBm, is filtered out.

Images of each of the Wi-Fi tags are taken and speeded up robust features (SURF) descriptors of the images corresponding to each of the Wi-Fi tags are calculated. The calculation process is presented as follows.

The center point of an image of a Wi-Fi tag is selected as a SURF point of the image and a square box around the SURF point is defined. The side length of the square box is 20 s, where s=20 cm which represents a measured value. The square box is divided into 16 sub-regions, each of the sub-regions contains 25 pixels. Horizontal and vertical values of the 25 pixels are counted using Haar wavelet transform. Through the Haar wavelet transformation, the sum of the pixel values in the horizontal direction, the sum of the absolute values of the pixel values in the horizontal direction, the sum of the pixel values in the vertical direction and the sum of the absolute values of the pixel values in the vertical direction of the 25 pixels are counted. In other words, each of the sub-regions has 4 values, which are used to calculate and generate a 16*4=64-dimensional vector, that represents the SURF descriptor of the image of the Wi-Fi tag, as shown in FIG. 1.

Finally, plane coordinates of each of the Wi-Fi tags are calculated, and homography matrixes between the plane coordinates of each of the Wi-Fi tags and a world coordinate system are calculated.

The calculation process of the homography matrix is described as follows.

Supposed that (u, v) is the coordinates of an image coordinate system created by pixels and (X, Y, Z) is the coordinates of a three-dimensional (3D) spatial point in a world coordinate system. In view of the principle of small hole imaging, represented as:

$$\lambda [u\ v\ 1]^T = K[R\ t][X\ Y\ Z\ 1]^T,$$

where [u v 1] represents the homogeneous coordinates of the image coordinates in pixels, which is the scale factor, K represents an internal parameter matrix of a camera, R represents an external parameter matrix of the camera, $R=[R_1\ R_2\ R_3]$ represents an orthogonal identity matrix, t represents a 3D translation vector, and $[X\ Y\ Z\ 1]^T$ represents the homogeneous coordinate of the spatial point in the world coordinate system. For a point on the plane, Z=0, that is:

$$\lambda[u\ v\ 1]^T = K[R_1\ R_2\ R_3]^T[X\ Y\ 0\ 1]^T = K[R_1\ R_2\ t]^T[X\ Y\ 1]^T.$$

The definition of the homography matrix is represented as:

$$H = K[R_1\ R_2\ t].$$

The homography matrix H is represented by 3×3, having 9 elements in total, which can be expanded into:

$$H = \begin{bmatrix} h_1 & h_2 & h_3 \\ h_4 & h_5 & h_6 \\ h_7 & h_8 & h_9 \end{bmatrix}.$$

For the points on the plane:

$$\lambda \begin{bmatrix} u \\ v \\ 1 \end{bmatrix} = \begin{bmatrix} h_1 & h_2 & h_3 \\ h_4 & h_5 & h_6 \\ h_7 & h_8 & h_9 \end{bmatrix} \begin{bmatrix} X \\ Y \\ 1 \end{bmatrix}.$$

Thus, the elements in the matrix can be calculated by:

$$\lambda = h_3 X + h_6 Y + h_9$$

$$\lambda u = h_1 X + h_4 Y + h_7$$

$$\lambda v = h_2 X + h_5 Y + h_8$$

$$u = \frac{h_1 X + h_4 Y + h_7}{h_3 X + h_6 Y + h_9}, \text{ and}$$

$$v = \frac{h_2 X + h_5 Y + h_8}{h_3 X + h_6 Y + h_9}.$$

When the homography matrix is calculated via 4 pairs of non-collinear points, the remaining 8 unknown elements in the H matrix are calculated by 4 pairs of points and 8 sets of equations, namely h1~h9. Therefore, the homography matrix between the image coordinates of the Wi-Fi tag and the world coordinate system can be obtained through the 4 non-collinear vertices of the Wi-Fi tag.

The signal strength list, the SURF descriptors, the homography matrixes and the coordinate values of the world coordinate system corresponding to the vertexes of the Wi-Fi tag are stored in the map database.

Figure 2:
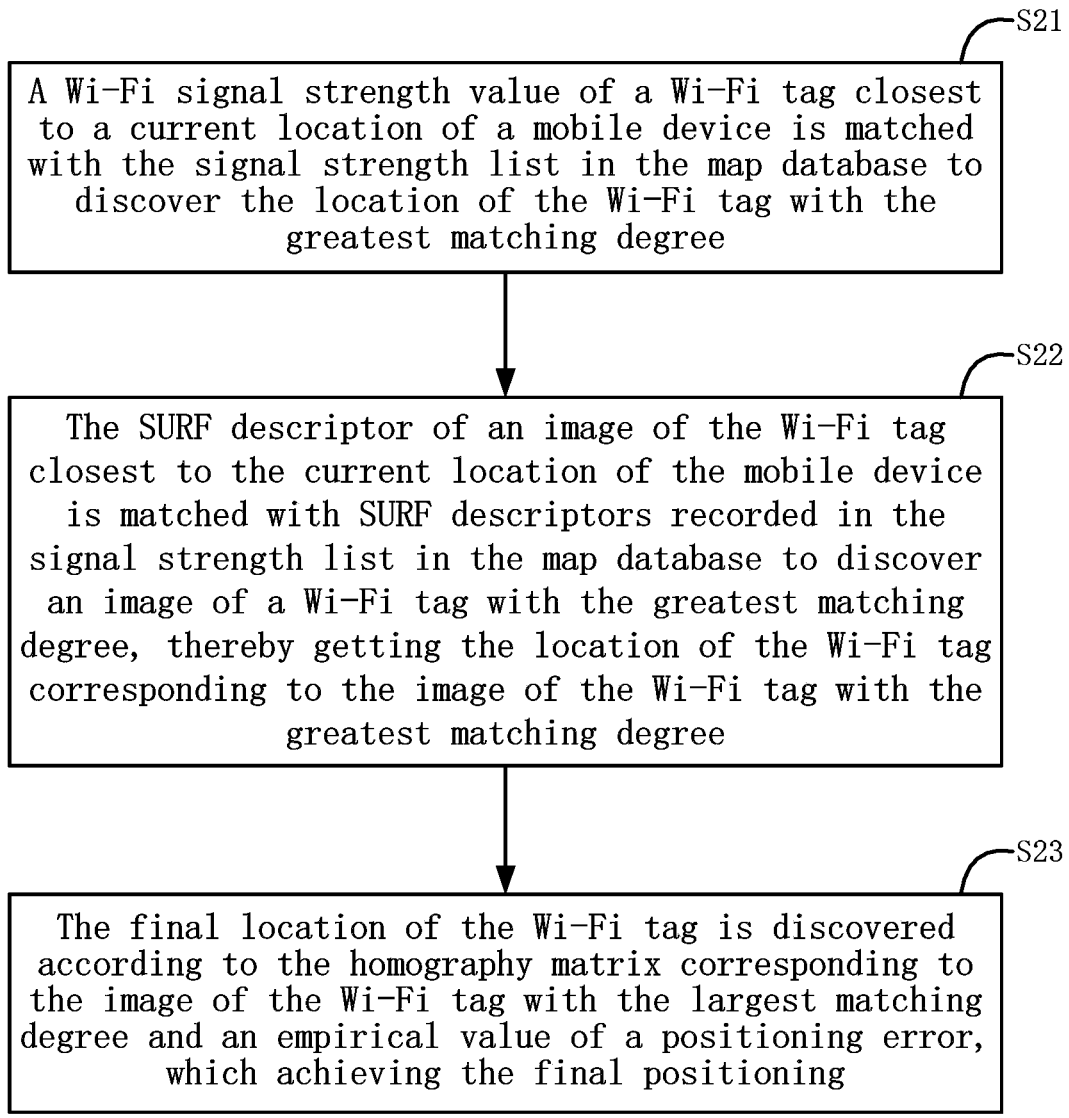
FIG. 2 is a flowchart of a first embodiment of an indoor positioning method based on image visual features of the preset disclosure.

FIG. 2 is a flowchart of a first embodiment of an indoor positioning method based on image visual features, applied in an electronic device, of the preset disclosure. The order of the steps in the flowchart can be changed and some steps can be omitted according to different requirements.

In block S21, a Wi-Fi signal strength value of a Wi-Fi tag closest to a current location of a mobile device is matched with the signal strength list in the map database.

The location of the Wi-Fi tag with the greatest matching degree can be discovered according to the number of the Wi-Fi APs and the signal strength values recorded in the signal strength list.

In block S22, the SURF descriptor of an image of the Wi-Fi tag closest to the current location of the mobile device is matched with SURF descriptors recorded in the signal strength list in the map database to discover an image of a Wi-Fi tag with the greatest matching degree, thereby getting the location of the Wi-Fi tag corresponding to the image of the Wi-Fi tag with the greatest matching degree.

In block S23, the final location of the Wi-Fi tag is discovered according to the homography matrix corresponding to the image of the Wi-Fi tag with the largest matching degree and an empirical value of a positioning error, which achieving the final positioning.

The Wi-Fi tag closest to the mobile device can be found through the above three different matching methods, and the precise location information of the mobile device can be obtained according to the found Wi-Fi tag The Wi-Fi tag closest to the mobile device can be found through the above three different matching methods. Precise location information of the mobile device can be obtained according to the found Wi-Fi tag.

In theory, the above three matching methods can find the same Wi-Fi tag. If a different Wi-Fi tag is found, accurate positioning information is determined in other ways. If two of the matching methods discover the same Wi-Fi tag, for example, it can be determined that the location information of the mobile device is the location of the discovered Wi-Fi tag.

Figure 3:
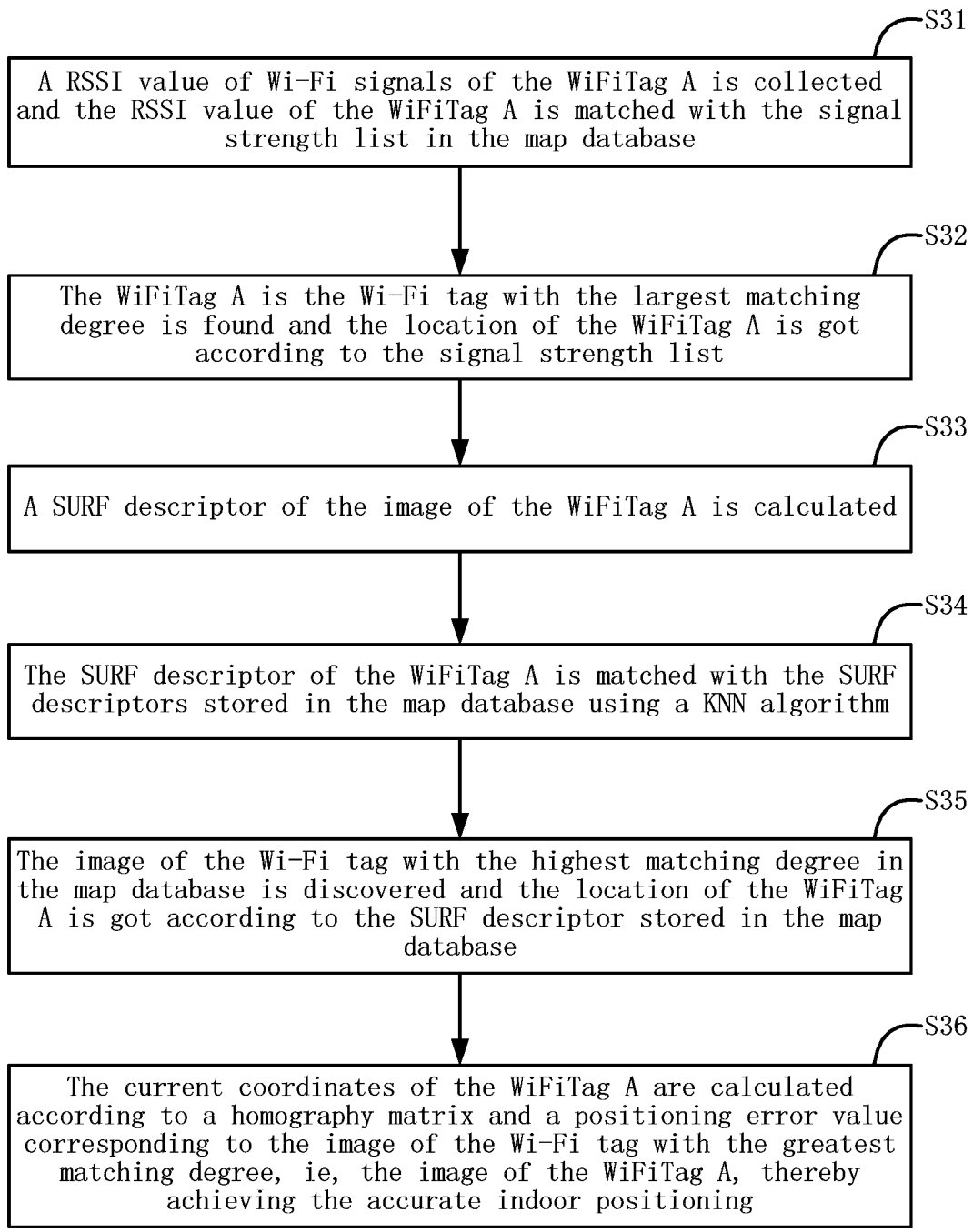
FIG. 3 is a flowchart of a second embodiment of the indoor positioning method based on image visual features of the preset disclosure.

FIG. 3 is a flowchart of a second embodiment of an indoor positioning method based on image visual features, applied in an electronic device, of the preset disclosure. The order of the steps in the flowchart can be changed and some steps can be omitted according to different requirements.

In block S31, when the mobile device moves near one of the Wi-Fi tags, for example, WiFiTag A, in the indoor map, a RSSI value of Wi-Fi signals of the WiFiTag A is collected. The RSSI value of the WiFiTag A is matched with the signal strength list in the map database.

An initial matching is performed through the Wi-Fi signals, and the matching formula is represented as follows:

$$M(x, y) = \prod_{i=1}^{N}\left(1 + \lambda \exp\left(-\left(\frac{(x_i - y_i)}{x_i - \alpha}\right)^2\right)\right) = (1+\lambda)^N \prod_{i=1}^{N} \exp\left(-\left(\frac{(x_i - y_i)}{x_i - \alpha}\right)^2\right).$$

where N is the number of the Wi-Fi APs within the signal range of the Wi-Fi tag, x is the RSSI value between a Wi-Fi AP and a Wi-Fi tag in the map database, y is the RSSI value between a Wi-Fi AP and a Wi-Fi tag collected in the positioning phase, and $\lambda$ and $\alpha$ are measured values.

In block S32, when the matching is complete, it can be found in the signal strength list that the WiFiTag A is the Wi-Fi tag with the largest matching degree, that is, the matching distance is the smallest and the RSSI value is the closest. Thus, the location of the WiFiTag A can be got according to the signal strength list.

In block S33, a SURF descriptor of the image of the WiFiTag A is calculated.

In block S34, the SURF descriptor of the WiFiTag A is matched with the SURF descriptors stored in the map database using the K-nearest neighbor (KNN) algorithm.

In block S35, the image of the Wi-Fi tag with the highest matching degree in the map database is discovered and the location of the WiFiTag A is got according to the SURF descriptor stored in the map database.

In block S36, the current coordinates of the WiFiTag A are calculated according to a homography matrix and a positioning error value corresponding to the image of the Wi-Fi tag with the greatest matching degree, ie, the image of the WiFiTag A, thereby achieving the accurate indoor positioning.

Assuming that the homography matrix between the image coordinates of a Wi-Fi tag and a world coordinates is H, an internal parameter K of a camera of the mobile device used to capture an image of a Wi-Fi tag is collected. A distance D1 between the camera of the mobile phone and the Wi-Fi tag during the image of the Wi-Fi tag is captured can be calculated according to the homography matrix H and the internal parameter K. Assuming that the resolution of the captured image is the same as the resolution of the image when the mobile device is positioned, a positioning error measurement value Δd is determined according to the experimental method, and the distance between the mobile device and the Wi-Fi tag is D1±Δd. The coordinates of the current mobile device in the plane map can be determined using the following formula with combining the measured coordinates (u, v) of the Wi-Fi tag on the plane map. The formula is represented as follows:

$$\lambda[u\ v\ 1]^T = H[X\ Y\ Z\ 1]^T (D1 \pm \Delta d)$$

Figure 4:
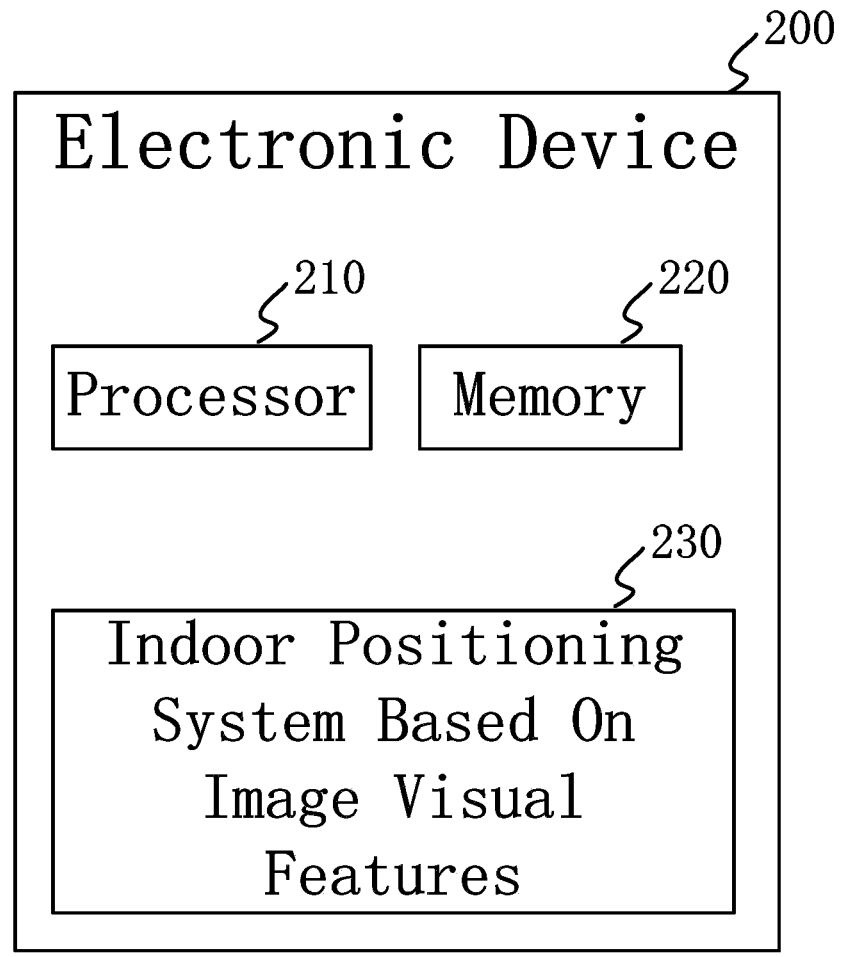
FIG. 4 is a block diagram of an embodiment of the hardware architecture of an electronic device using the method of the preset disclosure.

The Wi-Fi tag closest to the mobile device can be found through the above three different matching methods, and the precise location information of the mobile device can be obtained according to the found Wi-Fi tag FIG. 4 is a block diagram of an embodiment of the hardware architecture of an electronic device using the indoor positioning method based on image visual features of the preset disclosure. The electronic device 200 may, but is not limited to, connect to a processor 210, a memory 220, and an indoor positioning system based on image visual features 230 via system buses. The electronic device 200 shown in FIG. 4 may include more or fewer components than those illustrated, or may combine certain components.

The memory 220 stores a computer program, such as the indoor positioning system based on image visual features 230, which is executable by the processor 210. When the processor 210 executes the indoor positioning system based on image visual features 230, the blocks in one embodiment of the indoor positioning method based on image visual features applied in the electronic device 200 are implemented, such as blocks S21 to S23 shown in FIG. 2 and blocks S31 to S36 shown in FIG. 3.

It will be understood by those skilled in the art that FIG. 4 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the indoor positioning system based on image visual features 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The indoor positioning system based on image visual features 230 can be partitioned into one or more modules/units that are stored in the memory 220 and executed by the processor 210. The one or more modules/units may be a series of computer program instructions capable of performing particular functions of the indoor positioning system based on image visual features 230.

Figure 5:
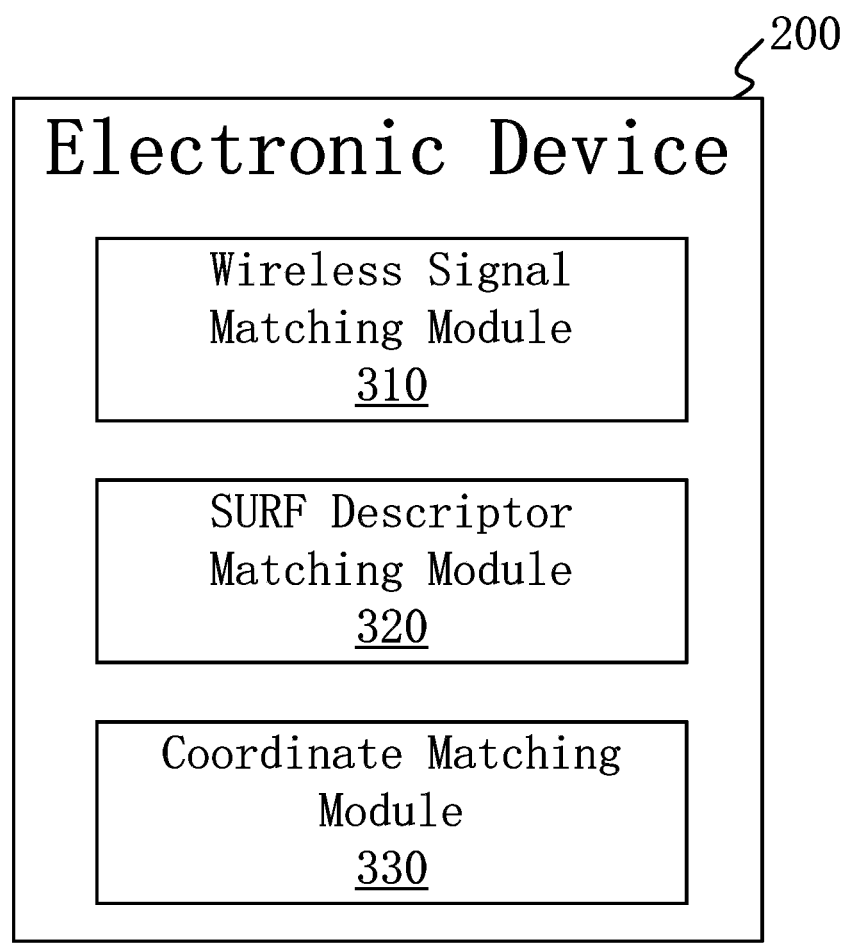
FIG. 5 is a schematic diagram of functional blocks of the electronic device using the method according to an embodiment of the preset disclosure.

FIG. 5 is a schematic diagram of an embodiment of functional blocks of the electronic device using the method of the preset disclosure.

The electronic device 200, such as a mobile phone, comprises a wireless signal matching module 310, a SURF descriptor matching module 320 and a coordinate matching module 330.

The wireless signal matching module 310 matches a Wi-Fi signal strength value of a Wi-Fi tag closest to a current location of a mobile device with the signal strength list in the map database, and discovers the location of the Wi-Fi tag with the greatest matching degree according to the number of the Wi-Fi APs and the signal strength values recorded in the signal strength list.

The SURF descriptor matching module 320 matches the SURF descriptor of an image of the Wi-Fi tag closest to the current location of the mobile device with SURF descriptors recorded in the signal strength list in the map database to discover an image of a Wi-Fi tag with the greatest matching degree, thereby getting the location of the Wi-Fi tag corresponding to the image of the Wi-Fi tag with the greatest matching degree.

The coordinate matching module 330 discovers the final location of the Wi-Fi tag according to the homography matrix corresponding to the image of the Wi-Fi tag with the largest matching degree and an empirical value of a positioning error, which achieving the final positioning.

The following describes the detailed processing of the electronic device 200 executing the indoor positioning method based on image visual features according to the embodiment of the present invention.

When the mobile device moves near one of the Wi-Fi tags, for example, WiFiTag A, in the indoor map, the wireless signal matching module 310 collects a RSSI value of Wi-Fi signals of the WiFiTag A and matches the RSSI value of the WiFiTag A with the signal strength list in the map database.

An initial matching is performed through the Wi-Fi signals, and the matching formula is represented as follows:

$$M(x, y) = \prod_{i=1}^{N}(1+\lambda)\exp\left(-\left(\frac{(x_i - y_i)}{x_i - \alpha}\right)^2\right) = (1+\lambda)^N \prod_{i=1}^{N}\exp\left(-\left(\frac{(x_i - y_i)}{x_i - \alpha}\right)^2\right).$$

where N is the number of the Wi-Fi APs within the signal range of the Wi-Fi tag, x is the RSSI value between a Wi-Fi AP and a Wi-Fi tag in the map database, y is the RSSI value between a Wi-Fi AP and a Wi-Fi tag collected in the positioning phase, and λ and α are measured values.

When the matching is complete, the wireless signal matching module 310 discovers that the WiFiTag A is the Wi-Fi tag with the largest matching degree in the signal strength list, that is, the matching distance is the smallest and the RSSI value is the closest, and gets the location of the WiFiTag A according to the signal strength list.

The SURF descriptor matching module 320 calculates a SURF descriptor of the image of the WiFiTag A.

The SURF descriptor matching module 320 matches the SURF descriptor of the WiFiTag A with the SURF descriptors stored in the map database using the K-nearest neighbor (KNN) algorithm.

The SURF descriptor matching module 320 discovers the image of the Wi-Fi tag with the highest matching degree in the map database and gets the location of the WiFiTag A according to the SURF descriptor stored in the map database.

The coordinate matching module 330 calculates the current coordinates of the WiFiTag A according to a homography matrix and a positioning error value corresponding to the image of the Wi-Fi tag with the greatest matching degree, ie, the image of the WiFiTag A, thereby achieving the accurate indoor positioning.

Assuming that the homography matrix between the image coordinates of a Wi-Fi tag and a world coordinates is H, an internal parameter K of a camera of the mobile device used to capture an image of a Wi-Fi tag is collected. A distance D1 between the camera of the mobile phone and the Wi-Fi tag during the image of the Wi-Fi tag is captured can be calculated according to the homography matrix H and the internal parameter K. Assuming that the resolution of the captured image is the same as the resolution of the image when the mobile device is positioned, a positioning error measurement value $\Delta d$ is determined according to the experimental method, and the distance between the mobile device and the Wi-Fi tag is D1$\pm\Delta d$. The coordinates of the current mobile device in the plane map can be determined using the following formula with combining the measured coordinates (u, v) of the Wi-Fi tag on the plane map. The formula is represented as follows:

$$\lambda[u\ v\ 1]^T = H[X\ Y\ Z\ 1]^T (D1\pm\Delta d)$$

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:

1. An indoor positioning method based on image visual features executable by a client, comprising:
    matching a Wi-Fi signal strength value of a Wi-Fi tag closest to a current location of a mobile device with a signal strength list in a map database to obtain a first location of a first Wi-Fi tag with the greatest matching degree;
    matching a speeded up robust features (SURF) descriptor of an image of the Wi-Fi tag closest to the current location of the mobile device with SURF descriptors recorded in the signal strength list in the map database to discover an image of a Wi-Fi tag with the greatest matching degree, thereby obtaining a second location of a second Wi-Fi tag corresponding to the image of the Wi-Fi tag with the greatest matching degree;
    obtaining a three location of a three Wi-Fi tag according to a homography matrix corresponding to the image of the Wi-Fi tag with the largest matching degree; and
    obtaining positioning information of the mobile device according to the first location, the second location and the third location.

2. The method of claim 1, further comprising:
    obtain the first location of the first Wi-Fi tag with the greatest matching degree according to the number of Wi-Fi access points (APs) and the signal strength values recorded in the signal strength list.

3. An indoor positioning method based on image visual features executable by a client, comprising:
    when a mobile device moves near one of Wi-Fi tags, collecting signal strength values of Wi-Fi signals of Wi-Fi APs near the Wi-Fi tag;
    matching the signal strength values of the Wi-Fi tag with a signal strength list in a map database;
    obtaining a first location of a first Wi-Fi tag with the greatest matching degree according to the matching result of the signal strength values;
    calculating a SURF descriptor of an image of the Wi-Fi tag;
    matching the SURF descriptor with SURF descriptors recorded in the map database;
    discovering an image of a Wi-Fi tag with the highest matching degree in the map database according to the matching result of the SURF descriptors and obtaining a second location of a second Wi-Fi tag according to the SURF descriptors recorded in the map database;
    calculating a homography matrix based on the image of the Wi-Fi tag with the greatest matching degree;
    calculating current coordinates of a third Wi-Fi tag according to the homography matrix to obtain a third location of the third Wi-Fi tag; and
    obtaining positioning information of the mobile device according to the first location, the second location and the third location.

4. The method of claim 3, wherein further comprising:
    matching the signal strength values of the Wi-Fi tag with the signal strength list in the map database using a matching formula represented as:

$$M(x, y) = \prod_{i=1}^{N}(1+\lambda)\exp\left(-\left(\frac{(x_i - y_i)}{x_i - \alpha}\right)^2\right) = (1+\lambda)^N \prod_{i=1}^{N}\exp\left(-\left(\frac{(x_i - y_i)}{x_i - \alpha}\right)^2\right);$$

where N is the number of the Wi-Fi APs within a signal range of the Wi-Fi tag, x is a signal strength value between a Wi-Fi AP and a Wi-Fi tag in the map database, y is a signal strength value between a Wi-Fi AP and a Wi-Fi tag collected in a positioning phase, and $\lambda$ and $\alpha$ are measured values.

5. The method of claim 3, further comprising:
    matching the SURF descriptor with the SURF descriptors stored in the map database using a K-nearest neighbor (KNN) algorithm.

6. The method of claim 3, wherein each of the signal strength values in the signal strength list in the map database is greater than a preset value.

7. The method of claim 3, further comprising:
    calculating the homography matrix according to three-dimensional coordinates of 4 vertices of the image of the Wi-Fi tag in space.

8. The method of claim 3, wherein the step of calculating the SURF descriptor of the image of the Wi-Fi tag further comprises:
    selecting the center point of the image of the Wi-Fi tag as a SURF point of the image;

taking a square box around the SURF point;

dividing the square box into 16 sub-regions, wherein each of the sub-region contains 25 pixels;

counting the sum of the pixel values in the horizontal direction, the sum of the absolute values of the pixel values in the horizontal direction, the sum of the pixel values in the vertical direction and the sum of the absolute values of the pixel values in the vertical direction of the 25 pixels through Haar wavelet transformation, to obtain the SURF descriptor.

9. An electronic device comprising:

a wireless signal matching module, configured to, when a mobile device moves near one of Wi-Fi tags, collect signal strength values of Wi-Fi signals of Wi-Fi APs near the Wi-Fi tag, match the signal strength values of the Wi-Fi tag with a signal strength list in a map database, and obtain a first location of a first Wi-Fi tag with the greatest matching degree according to the matching result of the signal strength values;

a SURF descriptor matching module, configured to calculate a SURF descriptor of an image of the Wi-Fi tag, match the SURF descriptor with SURF descriptors recorded in the map database, discover an image of a Wi-Fi tag with the highest matching degree in the map database according to the matching result of the SURF descriptors and obtaining a second location of a second Wi-Fi tag according to the SURF descriptors recorded in the map database, and calculate a homography matrix based on the image of the Wi-Fi tag with the greatest matching degree; and a coordinate matching module, configured to calculate current coordinates of a third Wi-Fi tag according to the homography matrix to obtain a third location of the third Wi-Fi tag, and obtain positioning information of the mobile device according to the first location, the second location and the third location.

10. The electronic device of claim 9, wherein further comprising:

matching the signal strength values of the Wi-Fi tag with the signal strength list in the map database using a matching formula represented as:

$$M(x, y) = \prod_{i=1}^{N}(1+\lambda)\exp\left(-\left(\frac{(x_i - y_i)}{x_i - \alpha}\right)^2\right) = (1+\lambda)^N \prod_{i=1}^{N}\exp\left(-\left(\frac{(x_i - y_i)}{x_i - \alpha}\right)^2\right);$$

where N is the number of the Wi-Fi APs within a signal range of the Wi-Fi tag, x is a signal strength value between a Wi-Fi AP and a Wi-Fi tag in the map database, y is a signal strength value between a Wi-Fi AP and a Wi-Fi tag collected in a positioning phase, and $\lambda$ and $\alpha$ are measured values.

11. The electronic device of claim 9, further comprising:

matching the SURF descriptor with the SURF descriptors stored in the map database using a K-nearest neighbor (KNN) algorithm.

12. The electronic device of claim 9, wherein each of the signal strength values in the signal strength list in the map database is greater than a preset value.

13. The electronic device of claim 9, further comprising:

calculating the homography matrix according to three-dimensional coordinates of 4 vertices of the image of the Wi-Fi tag in space.

14. The electronic device of claim 9, wherein the step of calculating the SURF descriptor of the image of the Wi-Fi tag further comprises:

selecting the center point of the image of the Wi-Fi tag as a SURF point of the image;

taking a square box around the SURF point;

dividing the square box into 16 sub-regions, wherein each of the sub-region contains 25 pixels;

counting the sum of the pixel values in the horizontal direction, the sum of the absolute values of the pixel values in the horizontal direction, the sum of the pixel values in the vertical direction and the sum of the absolute values of the pixel values in the vertical direction of the 25 pixels through Haar wavelet transformation, to obtain the SURF descriptor.

* * * * *